Aug. 2, 1966 E. A. WIMUNC 3,264,192
MULTI-SECTION CONTROL ROD WITH THERMAL EXPANSION JOINT
Filed June 4, 1965 2 Sheets-Sheet 1
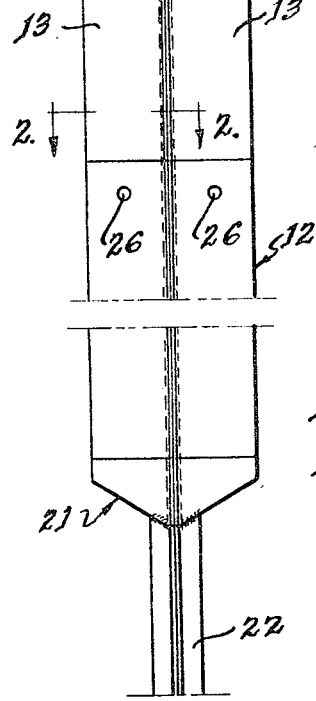
FIG-1
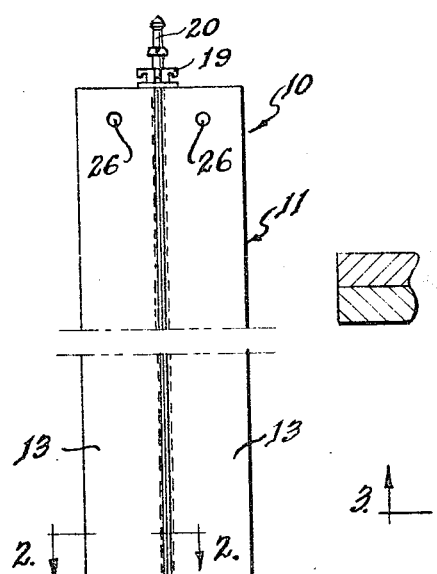
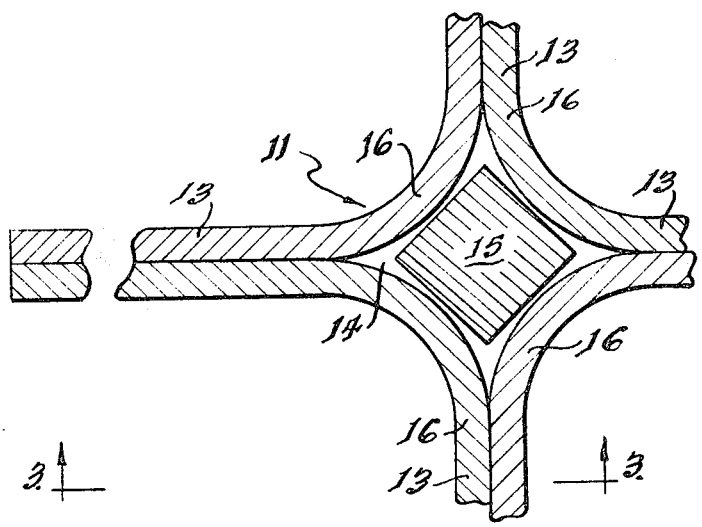
FIG-2
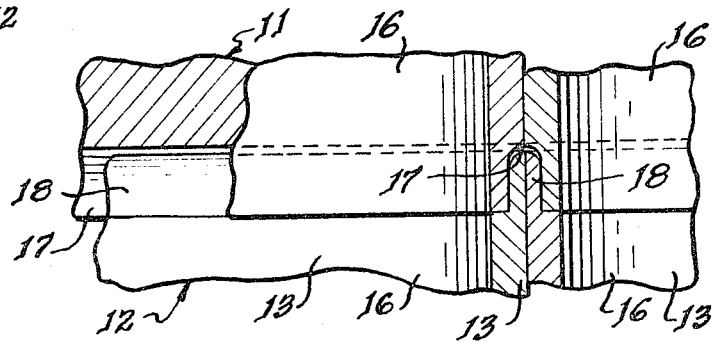
FIG-3
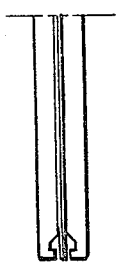
INVENTOR.
Edward A. Wimunc
BY
*[signature]*
Attorney 3,264,192
MULTI-SECTION CONTROL ROD WITH THERMAL EXPANSION JOINT
Edward A. Wimunc, Downers Grove, Ill., assignor to the United States of America as represented by the United States Atomic Energy Commission
Filed June 4, 1965, Ser. No. 461,561
7 Claims. (Cl. 176—86)

The invention described herein was made in the course of, or under, a contract with the U.S. Atomic Energy Commission.

This invention relates to a control rod for a nuclear reactor and more particularly to a construction accommodating different rates of expansion in different sections of a control rod.

In certain reactors such as the Experimental Boiling Water Reactor, operated by Argonne National Laboratory, at Argonne, Illinois, it is highly desirable or imperative to use a control rod formed of multilegged blade-like sections having different neutron-absorbing characteristics. If the control-rod sections have markedly different coefficients of thermal expansion, difficulty is encountered in fastening the sections to one another while permitting them to expand different amounts in the high temperatures of reactor operation without warping of the control rod or impairing of the connections between the sections.

For a disclosure of Experimental Boiling Water Reactor, reference is made to Chapter V of "Boiling Water Reactors" by A. W. Kramer, published by Addison-Wesley Publishing Co., Reading, Massachusetts, in 1958, and to Report ANL-5607 of Argonne National Laboratory, dated May 1957.

According to the present invention, the sections of the control rod are provided at their engaging ends with transverse tongues and grooves engaging one another while being kept free of connections that prevent relative movement of the sections in the directions in which the tongues and grooves extend. The control-rod sections are pressed together longitudinally and are prevented from having relative transverse movement transverse of the tongues and grooves while being free to move relatively in the directions of the tongues and grooves. Thus, the sections are held together sufficiently for necessary longitudinal adjustment of the control rod incidental to reactor operation and yet accommodate differential expansion.

In the drawings:

FIG. 1 is an elevational view of the control rod of the present invention;

FIG. 2 is a transverse sectional view taken on the line 2—2 of FIG. 1;

FIG. 3 is a fragmentary longitudinal sectional view taken on the line 3—3 of FIG. 2.

Figure 4:
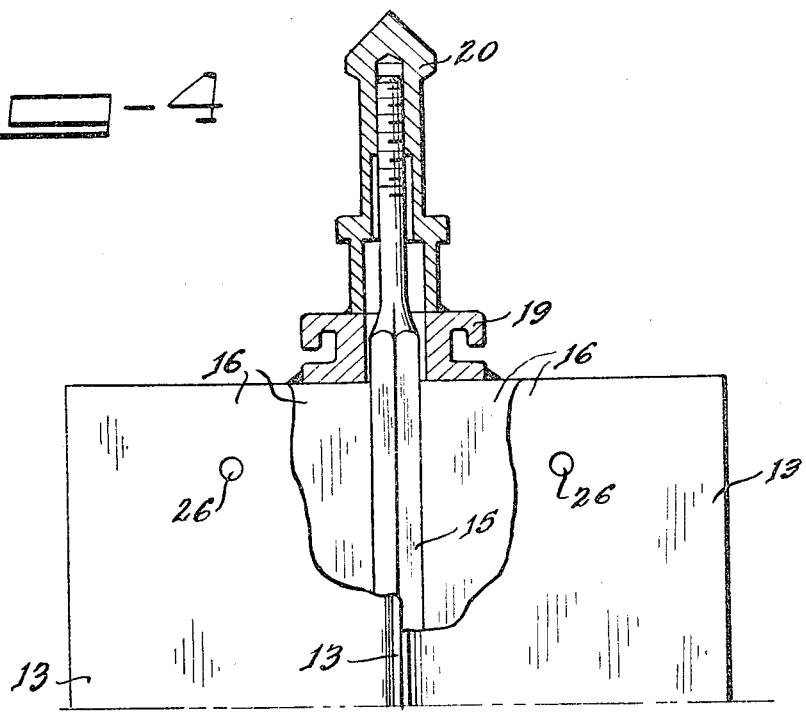
FIG. 4 is a fragmentary elevational view of the control rod with parts in section.
Figure 4:
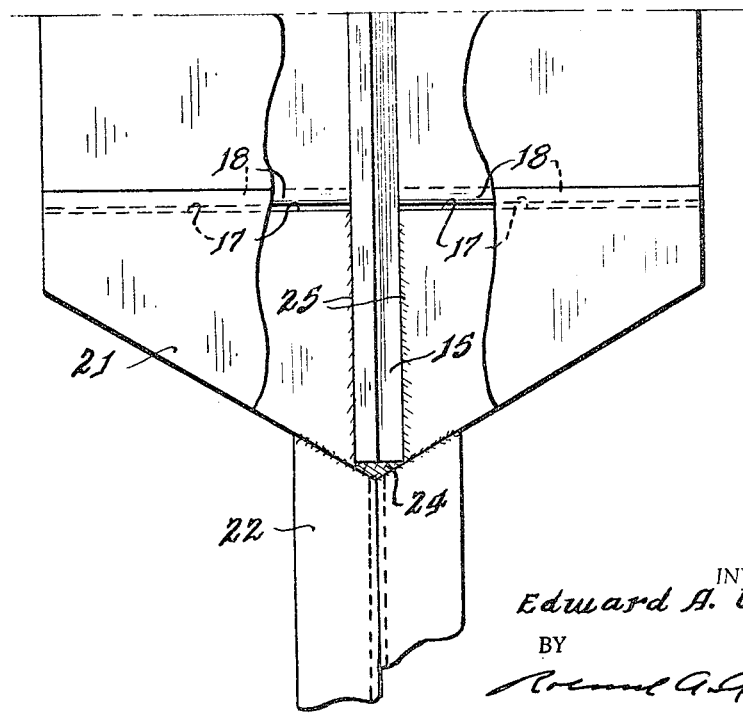

As shown in FIG. 1, a control rod 10 of the present invention comprises a section 11, which is a good neutron absorber and may be formed of 304 stainless steel to which 2% by weight of boron has been added. The control rod 10 further comprises a section 12 which is a poor neutron absorber and may be formed of Zircaloy–II. 304 stainless steel has the following composition: 08 w/o max. C, 2.00 w/o max. Mn, 1.00 w/o max. Si; 18.00–20.00 w/o Cr, 8.00–12.00 w/o Ni, and the balance substantially all Fe. Zircaloy–II has the following composition: 1.5 w/o Sn, .12 w/o Fe, .01 w/o Cr, .05 w/o Ni, and the balance substantially all Zr.

As shown in FIG. 2, section 11 has a blade-like construction that when considered in transverse section is cruciform and has four legs 13 which are spaced 90° from one another and extend radially outward from a center at which is located a central longitudinal hole 14 through which a tension member 15 extends. The section 11 is formed of four angle members 16 spot-welded to one another. Each leg 13 is formed of two angle members 16. Each angle member forms part of two legs 13.

The section 12 is similarly formed of four angle members 16 spot-welded to form four radial legs 13 and central longitudinal hole 14. Two of the angle members 16 of section 12 may be observed in FIG. 3 helping to form three legs 13.

The thickness of each leg 13 of each of the sections 11 and 12 may be ¼", and the width of each of the sections measured from the outer edge of a leg 13 to the outer edge of the diametrally opposite leg 13 may be 10". The section 11 may be 60" long, and the section 12, 34½" long.

As shown in FIGS. 1 and 3, the sections 11 and 12 are arranged for end-to-end engagement, with the four legs 13 of one section alined with, or lying in the same planes, respectively, as, the four legs of the other section. Each leg 13 of section 11 has in its end engaging the end of section 12 a groove 17 which extends transversely of the length of section 11 and in the plane of the leg 13. Each leg 13 of section 12 has on its end engaging the end of section 11, a tongue 18, which fits one of the grooves 17 and extends transversely of the length of section 12 and in the plane of the leg 13.

The sections 11 and 12 are held pressed against one another longitudinally end to end by the tension member 15, which extends through and beyond the sections 11 and 12 in the opening 14 therein. Beyond the upper end of the section 11 the tension member 15 extends through a hook fitting 19 welded to the section 11. Beyond the fitting 19 the tension member 15, as shown in FIG. 4, extends into a headed manipulating member 20 with which it has threaded engagement. The member 20 may be tack-welded to the hook fitting 19. The members 15 and 20 and fitting 19 may be of 304 stainless steel.

Below the section 12 there is a short section 21 which has four legs abutting the lower ends of the four legs 13 of the section 12. The legs of section 21 have grooves 17 fitting tongues 18 on the bottom of section 12 in the manner that grooves 17 on the bottom of section 11 fit the tongues 18 on the top of section 11. The short section has a four-leg extension 22, which has its upper end welded thereto and is appreciably narrower than the short section. As shown in FIG. 1, the lower end of the extension 22 has hook portions 23 which can engage a part (not shown) for adjusting the control rod 10 longitudinally in the reactor. The short section 21 and the extension 22 are formed of 304 stainless steel. The lower end of the tension member 15 is welded to the extension 22 as indicated at 24. The tension member 15 is also welded in and to the short section 21 as indicated at 25.

While the reactor is in operation, the control rod 10 is heated to an elevated temperature. The section 11 expands with increase in temperature at over twice the rate of the section 12, since section 11 is of stainless steel and section 12 of zirconium alloy. The difference in expansion rates of sections 11 and 12 is, of course, without deleterious effect as far as longitudinal expansion is concerned. With differential expansion transverse to the planes of the legs 13 of the sections 11 and 12, there is a slight loosening of the grooves 17 formed in the stainless-steel section 11 on the tongues 18 of the zirconium-alloy section 12. This loosening can be tolerated. Differential expansion in the planes of the legs 13 transverse to the axis of the sections 11 and 12 can easily take place without adverse effect on the sections, because such differential expansion occurs in the directions of the grooves 17 and tongues 18. Yet the sections are adequately held together against relative movement because of the engagement grooves 17 and tongues 18 and the holding by the tension member 15 in cooperation with the headed member 20 and the short section 21 in which the tension member is threaded and welded, respectively.

The control rod 10 may be inserted in and removed from the reactor by a tool (not shown) engaging the headed member 20. Alternatively, if the section 11 or section 12 is to be removed without removal of the rest of the rod, the rod is lifted part way out of the reactor by the member 20, the tack weld between the headed member 20 and the hooked fitting 19 is broken, the headed member is removed by unscrewing, and the section 11 is removed by a tool (not shown) engaging the hook fitting 19 or by a tool (not shown) engaging openings 26 in the upper portions of the legs 13 of the section 11. The section 12 also has openings 26 in the upper portions of its legs 13 for removal of the section 12.

It is understood that the invention is not to be limited by the details given herein but that it may be modified within the scope of the appended claims.

The embodiments of the invention in which an exclusive property or privilege is claimed are defined as follows:

1. A control rod comprising two long sections having markedly different coefficients of thermal expansion, one section being a good neutron absorber, the other being a poor neutron absorber, the sections being arranged with their ends in engagement, the end of one section having a groove transverse to the length of the said one section, the end of the other section having a tongue transverse to the length of the said other section, the tongue being received in the groove, and means urging the sections longitudinally together to keep the tongue in the groove, the sections being free of restraint in the direction in which the tongue and groove extend so as to accommodate differential expansion of the sections.

2. The control rod specified in claim 1, the section absorbing neutrons well being formed of boron-containing stainless steel, the other section being formed of a zirconium alloy.

3. The control rod specified in claim 1, the section absorbing neutrons well being formed of 304 stainless steel to which 2% by weight of boron has been added, the other section being formed of Zircaloy-II.

4. The control rod specified in claim 1, the sections having aligned longitudinal holes, the means urging the sections longitudinally together including a tension member located in the holes in the sections and extending the length thereof.

5. The control rod specified in claim 4, each section when considered in transverse section having a plurality of legs extending radially outward from a center in which the hole containing the tension member is located, one section having in the end engaging the end of the other section a plurality of grooves, one to a leg, extending radially outward from the center transversely to the length of the said one section, the said other section having in the end engaging the end of the said one section a plurality of tongues, one to a leg, extending radially outward from the center transversely to the length of the said other section, the tongues being received in the grooves.

6. The control rod specified in claim 5, one section being a good neutron absorber and being formed of a boron-containing stainless steel, the other section being a poor neutron absorber and being formed of a zirconium alloy.

7. The control rod specified in claim 5, each section having four legs, one section having the grooves, being a good neutron absorber, and being formed of 304 stainless steel to which 2% by weight of boron has been added, the other section having the tongues, being a poor neutron absorber, and being formed of Zircaloy-II.

References Cited by the Examiner

UNITED STATES PATENTS

| 3,081,248 | 3/1963 | Grant | 176—36 |
| 3,163,583 | 12/1964 | Widmer et al. | 176—86 |
| 3,205,148 | 9/1965 | Waine et al. | 176—78 |

FOREIGN PATENTS 977,544   12/1964   Great Britain.

DEWAYNE RUTLEDGE, *Primary Examiner.*

H. E. BEHREND, *Assistant Examiner.*